United States Patent Office 3,691,062
Patented Sept. 12, 1972

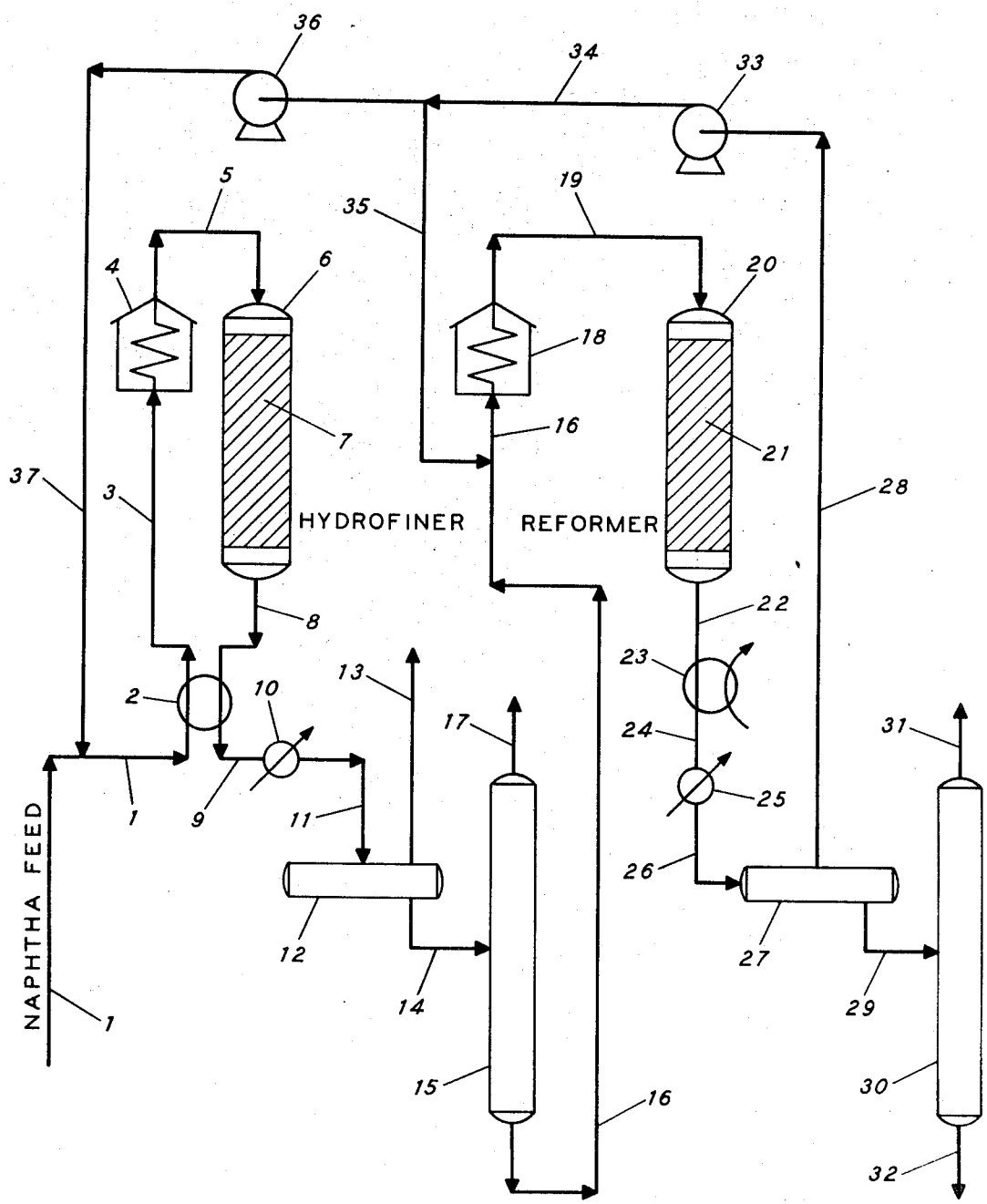

3,691,062
COMBINED HYDROFINING-REFORMING PROCESS
Willard M. Haunschild, Walnut Creek, Robert L. Jacobson, Pinole, and Charles S. McCoy, Orinda, Calif., assignors to Chevron Research Company, San Francisco, Calif.
Continuation of abandoned application Ser. No. 789,517, Jan. 7, 1969. This application June 25, 1971, Ser. No. 163,512
Int. Cl. C10g 23/00
U.S. Cl. 208—89
1 Claim

ABSTRACT OF THE DISCLOSURE

A combination hydrofining-reforming process wherein a naphtha feedstock low in sulfur and nitrogen is hydrofined, without substantial cracking, in a reaction zone in the presence of once-through hydrogen to convert sulfur and nitrogen to hydrogen sulfide and ammonia, followed by separation of the hydrogen sulfide and ammonia and reforming of the hydrofined naphtha with a catalyst comprising platinum and rhenium associated with an alumina-containing support. The reforming effluent is processed to recover gasoline and hydrogen-rich gas, a portion of the hydrogen-rich gas being used in the hydrofining reaction zone as the once-through hydrogen.

This application is a continuation of Ser. No. 789,517, filed Jan. 7, 1969, now abandoned.

BACKGROUND OF THE INVENTION

Field

The process of the present invention relates to a hydrofining-reforming process. More particularly, the present invention relates to hydrofining a naphtha fraction to reduce sulfur and nitrogen compounds, then reforming the essentially sulfur- and nitrogen-free naphtha with a platinum-rhenium catalyst.

Prior art

A recent development in the field of catalytic reforming has been a catalyst composition comprising platinum and rhenium in association with a carrier, for example, alumina, and reforming with said catalyst, as disclosed in U.S. Patent 3,415,737. The presence of rhenium with the platinum-containing catalyst composite enhances measurably the yield stability of the catalyst as compared to a catalyst comprising platinum without rhenium. The platinum-rhenium catalyst, however, is sensitive to the presence of sulfur in the reaction zone. The sulfur detrimentally affects the activity as well as the yield stability of the platinum-rhenium catalyst. Thus, in order to obtain the full advantage of the presence of rhenium with a platinum catalyst, it is desirable that the sulfur in the naphtha feed be reduced, e.g., by hydrofining, to at least 10 p.p.m. and preferably to less than 5 p.p.m.

SUMMARY OF THE INVENTION

A unique hydrofining-reforming process has now been developed which permits reduction of sulfur and nitrogen impurities in a feed to be reformed while taking advantage of the remarkable yield stability of the platinum-rhenium catalyst when reforming a low-sulfur naphtha feed. The combined process is substantially self-sufficient in hydrogen for long periods of time, thereby eliminating the need for the use of an external source of hydrogen. The process also eliminates the necessity of recovering hydrogen from the hydrofiner effluent for recycle to the hydrofiner.

The process basically comprises hydrofining a selected naphtha fraction boiling within the range of 150 to 450° F. containing less than 1000 p.p.m. organic sulfur and less than 10 p.p.m. organic nitrogen, and preferably at least 20 volume percent naphthenes, without substantial cracking, in a hydrofining reaction zone with a hydrofining catalyst at hydrofining conditions using hydrogen on a once-through basis to convert organic sulfur and organic nitrogen to hydrogen sulfide and ammonia, separating the hydrofined naphtha from the hydrogen sulfide and ammonia, and then reforming the substantially sulfur- and nitrogen-free naphtha in a reforming reaction zone with a catalyst comprising a platinum group component and a rhenium component. The reforming catalyst contains from 0.01 to 3 weight percent platinum and 0.01 to 5 weight percent rhenium associated with an aluminum-containing support. The reforming reaction is conducted in the presence of substantially only hydrogen produced in the process, and at reforming conditions, to produce an effluent comprising a gasoline product of at least 90 F–1 clear octane rating and hydrogen. At least a portion of the hydrogen separated from the reforming reaction effluent is used in the hydrofining zone as said once-through hydrogen. A portion of the hydrogen can also be recycled to the reforming reactors, if desired.

BRIEF DESCRIPTION OF THE DRAWING

The process of the present invention will be more fully described by reference to the figure which shows a simplified diagram of the combined hydrofining-reforming process.

DESCRIPTION OF THE INVENTION

The feedstock which is employed in the combined hydrofining-reforming process of the present invention comprises a naphtha boiling within the range from about 150 to 450° F. The feedstock can be either a straight-run naphtha or a thermally cracked or a catalytically cracked naphtha or blends thereof. The feed should preferably contain at least 20 volume percent naphthenes. The presence of sufficient naphthenes, i.e., at least 20 volume percent, which are readily converted to aromatics and hydrogen in the reforming zone, ensures an adequate source of hydrogen to meet the needs of the hydrofining zone and reforming zone. Furthermore, the feed should contain less than 1000 p.p.m. organic sulfur and less than 10 p.p.m. organic nitrogen. Feeds which contain greater amounts of organic sulfur and/or organic nitrogen require excessive amounts of hydrogen and/or too severe operating conditions for purposes of the present invention. Greater than 10 p.p.m. organic nitrogen in the feed requires too much hydrogen and too severe operating conditions to convert the nitrogen to ammonia. Severe operating conditions generally produce cracking of feed components, thus resulting in the consumption of hydrogen and also resulting in the production of lighter boiling products often not suitable for gasoline. Whereas organic sulfur is relatively easily converted to hydrogen sulfide, particularly compared to converting organic nitrogen to ammonia the presence of excessive amounts of organic sulfur in the feed, for example, greater than 1000 p.p.m. sulfur, necessarily requires high amounts of hydrogen and severe reaction conditions to convert substantially all the organic sulfur to hydrogen sulfide.

The desired feed containing at least 20 volume percent naphthenes, less than about 1000 p.p.m. organic sulfur compounds, and less than about 10 p.p.m organic nitrogen compounds is passed to a hydrofining zone for contact with a hydrofining catalyst comprising a hydrogenation component at hydrofining conditions. Several suitable hydrofining catalysts comprising a hydrogenation component are available and are generally well known in the prior art. Suitable catalysts generally comprise the Group VIII metals, their oxides and/or sulfides thereof, mixed with Group VI–B metals, their oxides and/or sulfides thereof. The metal composites can be used in the undiluted form but preferably exist in combination with a support. Suitable carriers or supports are the inorganic oxides, e.g., alumina, silica, zirconia, titania, bauxite, magnesia, fuller's earth, and combinations theerof. The metal content on a support preferably ranges between about 2 to 25 weight percent. Suitable catalysts include cobalt-molybdate, chromic acid, nickel, iron, etc. which are deposited on carriers, such as alumina, or various other oxides, or gels. A suitable catalyst for the hydrofining process is, for example, an alumina-containing support with a minor proportion of molybdenum oxide and cobalt oxide. Sulfided nickel and tungsten on alumina as well as nickel-molybdenum on alumina can also be used.

The hydrofining is conducted under conditions of temperature, pressure, hydrogen flow rate and liquid hourly space velocity, correlated to provide the desired degree of organic sulfur and organic nitrogen conversion. The temperature is generally within the range of 550 to 850° F. and preferably 700 to 850° F. At temperatures below about 550° F., the rate of conversion of organic nitrogen and organic sulfur is too low for practical purposes whereas at temperatures above about 850° F. substantial cracking of the feed occurs. Also coke formation tends to increase markedly at higher temperatures. The temperature used will also depend on the activity of the hydrofining catalyst, higher temperatures being used with less active catalysts. The pressure in the hydrofining zone will generally lie within the range from about 100 to 700 p.s.i.g. and more preferably in the range of 200 to 700 p.s.i.g. Elevated pressures advantageously influence the rate and extent of hydrofining, as well as extend the catalyst activity and life. However, higher pressures increase the cost of the hydrofining operation. The liquid hourly space velocity in the reaction zone will generally be within the range of 0.1 to 10, preferably 1 to 5.

The hydrofining conditions are correlated to prevent substantial cracking of the naphtha feed. Inasmuch as the naphtha feed boils within the desired gasoline boiling range, cracking to lower boiling products results only in a loss in desired gasoline materials. Also, substantial cracking consumes hydrogen which is not desired. "Without substantial cracking" generally means that less than about 10 volume percent of the feed is converted to lower boiling products in the hydrofining zone and preferably less than 5 volume percent.

The flow of hydrogen into the hydrofining reactor is preferably maintained above about 200 s.c.f./bbl. and more preferably in the range of 300 to 1000 s.c.f./bbl. More generally, at least sufficient hydrogen is provided to supply that consumed in the conversion of sulfur and nitrogen compounds to hydrogen sulfide and ammonia, respectively, and the hydrogenation of unsaturated components, e.g., olefins, while maintaining a significant excess of hydrogen partial pressure. The hydrogen can be added to the feed prior to introduction of the feed into the hydrofining reactor or can be added to the hydrofining reactor separate from the feed. The hydrogen is passed through the reactor in contact with the catalyst on a once-through basis; that is, any excess hydrogen recovered from the hydrofiner effluent is not recycled to the hydrofining reaction zone. Thus, the expense of providing equipment for purifying hydrogen and compressing the hydrogen to recycle it to the hydrofining zone is eliminated.

The effluent from the hydrofining zone is treated to remove hydrogen sulfide and ammonia from the hydrofined naphtha. Removal of hydrogen sulfide and ammonia may be accomplished, for example, by injecting water or alkylized water into the hydrofiner effluent and passing the resulting mixture into a separator operating under such conditions that a water phase containing essentially all the hydrogen sulfide and ammonia present in the effluent can be removed. Further purification of the hydrofined feed can be accomplished by a stripper or a distillation column. Also, the hydrogen sulfide and ammonia can be removed by passing the hydrofiner effluent to a separator at a temperature and pressure whereby substantially only hydrogen sulfide, ammonia, and hydrogen are in the gaseous state. The liquid naphtha is thus easily separated from the gases. While it is essential to free the naphtha of hydrogen sulfide and ammonia, hydrogen dissolved in the naphtha presents no problem, but is desirable. Other methods found in the prior art may be used to separate hydrogen sulfide and ammonia from the hydrofined naptha.

The resulting essentially sulfur- and nitrogen-free naphtha, that is, a naphtha containing less than about 10 p.p.m. organic nitrogen, preferably less than 5 p.p.m. organic nitrogen, and less than 10 p.p.m. organic sulfur, preferably less than 1 p.p.m. organic sulfur, is contacted in a reforming zone in the presence of hydrogen with a catalyst comprising a platinum group component and a rhenium component. The reforming is accomplished at reaction conditions including a liquid hourly space velocity of less than 10 and preferably from about 1 to 5, a temperature of from 700 to 1050° F. and preferably from 750 to 1000° F., and a pressure of from 125 to 750 p.s.i.g. and preferably 200 to 750 p.s.i.g. Preferably, the pressure in the reforming section of the combined system is such that hydrogen is available (e.g., at hydrogen recycle compressor discharge) at a pressure higher than the pressure in the hydrofining section. This eliminates the need for compressors to circulate hydrogen from the reformer to the hydrofiner. Temperature and pressure can be correlated with the liquid hourly space velocity to favor any particularly desirable reforming reaction, such as aromatization, isomerization, or dehydrogenation. The reaction conditions are also correlated to produce an effluent comprising gasoline products of at least 90 F–1 clear octane rating.

Reforming is accomplished in the presence of hydrogen. Hydrogen can be used to favor certain reforming reactions, for example, isomerization, hydrogenation, and/or hydrocracking. Preferably hydrogen is introduced into the reforming reactor at a rate varying from 0.5 to about 20 moles of hydrogen per mole of feed; the hydrogen can be in admixture with light gaseous hydrocarbons.

Reforming of the naphtha results in the production of hydrogen. Preferably at least 400 s.c.f. of hydrogen per barrel of feed to the reforming zone is produced over substantially the entire on-stream period of the reforming process. A hydrogen yield of at least 400 s.c.f./bbl. should generally be sufficient to accommodate the needs of the hydrofiner and the reformer. The hydrogen produced is generally removed from the reforming effluent and preferably at least a part of said hydrogen recycled to the reforming reaction zone. Thus, for purposes of the present invention excess hydrogen need not be added to the reforming system; reforming is thereby accomplished in the presence of substantially only hydrogen produced in the combined hydrofining-reforming process. By "substantially" is meant that no more than 5 percent of the hydrogen going to the hydrofining zone is from an external source.

During the initial startup of the reforming process it may be desirable to introduce some excess hydrogen into the reaction zone. The hydrogen can be introduced to the feed prior to contact of the feed with the catalyst or contacted with the catalyst simultaneously with the introduction of the feed to the reaction zone. Once the catalyst is onstream, that is, after a period of about 2 to 10 hours of reforming, excess hydrogen need not be added and for purposes of the present invention should not be added in substantial quantities to the hydrofining-reforming system. The hydrogen produced during the reforming reaction should be the only source of hydrogen.

Enough hydrogen should be produced in the reforming zone to satisfy the needs of the reforming process as well as the needs of the hydrofining process. Thus it is encompassed as part of the present invention that hydrogen produced in the reforming reaction is separated from the high octane gasoline fraction and at least a portion of said hydrogen is recycled to the hydrofining reaction zone as once-through hydrogen. Thus, for purposes of the present invention it is not necessary to recover the hydrogen from the hydrofining zone to recycle to said zone. The exceptional yield stability of the present platinum-rhenium catalyst enables production of sufficient hydrogen throughout the process to accommodate the needs of both the reformer and the hydrofiner. Thus the combined hydrofining-reforming process is substantially self-sufficient in hydrogen; i.e., no more than 5 percent of the hydrogen going to the hydrofining zone is from an external source. For purposes of the present invention it is preferred that the decline in yield of $C_5^+$ gasoline produced in the reforming zone be no greater than 2 volume percent over an onstream period of at least 2000 hours. When the yield decline is relatively small, which is an indication of the yield stability of the catalyst, the hydrogen produced will also be maintained at a high yield over the onstream period, and preferably at a relatively constant rate.

The platinum-rhenium catalyst which finds use in the present invention comprises a platinum group component and a rhenium component in association with an alumina-containing support. Any of the forms of alumina suitable as a support for reforming catalysts can be used. Furthermore, alumina can be prepared by a variety of methods for purposes of this invention. Thus, the alumina may be prepared by adding a suitable alkaline agent such as ammonium hydroxide to a salt of aluminum, such as aluminum chloride, aluminum nitrate, etc., in an amount to form aluminum hydroxide which on drying and calcining is converted to alumina. Alumina may also be prepared by the reaction of sodium aluminate with a suitable reagent to cause precipitation thereof with the resulting formation of aluminum hydroxide gel. Also, alumina may be prepared by the reaction of metallic aluminum with hydrochloric acid, acetic acid, etc., in order to form a hydrosol which can be gelled with a suitable precipitating agent, such as, ammonium hydroxide, followed by drying and calcination.

Other porous inorganic oxides can be present with the alumina. Thus, for example, porous inorganic oxides, such as, silica, zirconia, magnesia, and combinations thereof, may be present. The alumina should preferably be present, however, in an amount of at least 10 weight percent, and preferably 20 weight percent, based on the finished catalyst composite.

The platinum-rhenium catalyst of the present invention should comprise a platinum group component in an amount of from 0.01 to 3 weight percent and preferably from 0.1 to 1 weight percent based on the finished catalyst. A platinum group component embraces all the members of Group VIII of the Periodic Table having an atomic weight greater than 100 as well as compounds and mixtures of any of these. Thus, the platinum group components are the Group VIII noble metals or compounds thereof. Platinum is preferred because of its better performance in reforming. The concentration of the rhenium component in the finished catalyst composite is preferably in the range of from 0.01 to 5 weight percent and more preferably 0.1 to 2 weight percent. Regardless of the form in which the platinum group component and the rhenium component exist on the catalyst, whether as metal or compound, the weight percent of each is calculated as the metal. It is preferred that the rhenium component to platinum group component atom ratio be from 0.2 to 2.0 and more preferably that the atom ratio of rhenium to platinum group component not exceed 1.0.

The platinum group component and rhenium component can be associated with the alumina-containing composite by various methods. The platinum group component and rhenium component can be disposed on the alumina-containing composite in intimate admixture with each other by a suitable technique such as ion-exchange, coprecipitation, impregnation, etc. It is not necessary that the platinum group component and rhenium component be incorporated onto the porous alumina support by the same technique. One of the components can be associated with the alumina by one method, such as, for example, impregnation, and the other component associated with the alumina by another technique, such as, for example, coprecipitation. Furthermore, the components can be associated with the alumina either sequentially or simultaneously. It is generally preferred that the components be associated with the alumina by impregnation, either sequentially or simultaneously. In general the alumina is impregnated with an aqueous solution of a decomposable compound of platinum, etc., or rhenium, in sufficient concentration to provide the desired quantity of the platinum group component and rhenium component on the finished catalyst. To incorporate the preferred platinum group component, platinum, onto the alumina by impregnation, chloroplatinic acid is preferred. Other platinum group compounds are ammonium chloroplatinates, polyamineplatinum salts, palladium chloride, etc. Rhenium is suitably incorporated onto the support by impregnation with perrhenic acid. Ammonium, or potassium perrhenates, among others, can also be used.

The platinum group component and the rhenium component can be associated with the carrier at any stage of the catalyst preparation. For example, the components can be incorporated onto the alumina support while the alumina is in the gel or sol form. The components are desirably uniformly distributed on the surface of the carrier, preferably in intimate admixture with each other on the support.

Following incorporation of the carrier material with the platinum group component and rhenium component, the resulting composite is usually dried by heating at a temperature of, for example, no greater than about 500° F. and preferably at about 200 to 400° F. Thereafter the composite can be calcined at an elevated temperature, for example, up to about 1200° F., if desired.

The catalyst containing the platinum group component and rhenium component is preferably heated at an elevated temperature to convert the platinum group component and rhenium component to the metallic state. Preferably the heating is performed in the presence of hydrogen, or preferably dry hydrogen. It is particularly preferred that this prereduction be accomplished at a temperature in the range of 600 to 1300° F., and preferably 600 to 1000° F.

The catalyst can be promoted for reforming by the addition of halides, particularly fluoride or chloride. Bromides may also be used. The halides apparently provide a limited amount of acidity to the catalyst which is beneficial to most reforming operations. A catalyst promoted with halide preferably contains from 0.1 to 3 weight percent total halide content. The halides can be incorporated onto the catalyst carrier at any suitable stage of catalyst manufacture, e.g., prior to or following incorporation of the platinum group component and rhenium component. Some halide is often incorporated onto the carrier by impregnating with the platinum group component; that is, for example, impregnation with chloroplatinic acid normally results in chloride addition to the carrier. Additional halide may also be incorporated onto the alumina if desired. In general, the halides are combined with the alumina by contacting suitable compounds such as hydrogen fluoride, ammonium fluoride, hydrogen chloride, or ammonium chloride, either in the gaseous form or in a water soluble form with the alumina. Preferably the fluoride or chloride is incorporated onto the carrier from an aqueous solution containing the halide.

The catalyst can be sulfided prior to contact with the feed in the reaction zone. Sulfiding the catalyst prior to contact with the naphtha helps to reduce the production of light hydrocarbon gases during startup. The presulfiding can be done in situ or ex situ by passing a sulfur-containing gas, for example, $H_2S$, in the presence of hydrogen over the catalyst. Other presulfiding treatments are known in the prior art. Also, it has been found that on startup a small amount of sulfur, for example, $H_2S$, or dimethyldisulfide, added to the reforming zone with the feed helps reduce the initial hydrocracking activity of the catalyst. The sulfur can be introduced in any convenient manner and at any convenient location. It can be contained in the liquid hydrocarbon feed, the hydrogen-rich gas, a recycle gas stream, or any combination.

The operation of the present invention and additional features and advantages thereof will be more apparent by reference to the accompanying figure and the following description thereof.

Referring to the figure a naphtha feed boiling within the range of 150 to 450° F. and containing less than about 10 p.p.m. organic nitrogen, less than about 1000 p.p.m. organic sulfur and preferably at least about 20 volume percent naphthenes is passed via line 1 through heat exchanger 2, then via line 3 to furnace 4 wherein the naphtha is heated to hydrofining conditions. Thereafter the heated naphtha feed is passed via line 5 to hydrofiner 6 which contains a hydrogenation component 7, for example, a catalyst comprising nickel oxide and molybdenum oxide associated with alumina, the nickel and molybdenum oxide being present in an amount of from, for example, 2 to 20 weight percent and 5 to 40 weight percent, respectively. The catalyst is continuously contacted by the naphtha feed in the presence of hydrogen at hydrofining conditions including a temperature of from 550 to 850° F. and a pressure of from 100 to 700 p.s.i.g. The resulting conversions and reactions effected within reactor 6 are primarily exothermic, so that the hydrofiner effluent is discharged from the lower end of reactor 6 by way of line 8 at a temperature higher than that introduced thereto.

The hydrofining is accomplished in the presence of hydrogen which is introduced into the feed stream via line 36. The hydrogen is mixed with the feed prior to heating, then passed with the feed into hydrofiner 6 in contact with catalyst 7. Only hydrogen on a once-through basis is used in the hydrofiner which eliminates the need for separately recovering hydrogen from the hydrofiner effluent and recycling the hydrogen to the hydrofiner 6. Thus, the expense of compressors and recycle system is eliminated.

The heated stream from the hydrofiner 6 is passed by way of line 8 through the heat exchanger 2 which aids in heating the feed to the hydrofiner 6. The effluent is then passed via line 9 to cooler 10 and is discharged from the latter by way of line 11 into a separator 12. The receiver or separator 12 receives the effluent stream from reactor 6 at a temperature and pressure whereby substantially only hydrogen, hydrogen sulfide, and some resulting ammonia are in the gaseous state. The hydrogen-containing gaseous stream is passed from separator 12 by way of line 13. The hydrogen-containing stream can be introduced into a gas treating zone, which is not shown, to separately recover hydrogen, hydrogen sulfide and ammonia. Alternately, the hydrogen-containing stream from separator 12 may be used as fuel.

The liquid hydrofined naphtha fraction which contains some dissolved hydrogen sulfide and ammonia is passed by way of line 14 into a fractionator column 15. In the fractionator column 15 the liquid fraction is distilled, fractionated, and stabilized to provide a naphtha stream substantially free of hydrogen sulfide and ammonia, whereby a sulfur- and nitrogen-free naphtha as an effluent from the fractionator can be withdrawn by way of line 16. Gaseous hydrogen sulfide, ammonia, and perhaps very minor amounts of hydrogen and methane are discharged from the upper portion of fractionator 15 by way of line 17. As a preferred embodiment, the reactor effluent from hydrofiner 6 can be passed directly from heat exchanger 2 to fractionator 15, thereby bypassing cooler 10 and separator 12. Separation of the hydrogen sulfide and ammonia from the hydrofined naphtha can then be accomplished essentially in fractionator 15.

The essentially sulfur- and nitrogen-free naphtha fraction is passed via line 16 to catalytic reformer furnace 18, wherein the naphtha stream is heated to a temperature of from 700 to 1050° F. and introduced via line 19 into reforming reactor 20 containing a platinum-rhenium catalyst 21. The reforming is conducted in reactor 20 at a pressure of from 125 to 750 p.s.i.g. If desired, several catalytic reforming reactors may be present and suitable heating means provided to heat the reactant stream between each of the reactors. Although fixed beds of catalyst may be used to advantage in the reactors, other types of beds may be used, such as, for example, fluidized, or fluidized-fixed beds, suspensoid, or moving beds.

The effluent from reactor 20 is passed via line 22 through a suitable heat exchanger 23, then via line 24, through cooler 25. The cooled effluent is then passed via line 26 into a separator 27. Cooling is effected such that substantially only hydrogen is in the gaseous state within the separator 27 and is thereby withdrawn from separator 27 via line 28. The condensed hydrocarbons, consisting primarily of high octane number reformate of at least 90 F–1 clear octane and some normally gaseous hydrocarbons are passed from separator 27 via line 29 as a product stream to stabilizer 30. Light hydrocarbons, e.g., light paraffins are removed via line 31 and stabilized reformate removed through line 32.

Hydrogen, containing some light gases, withdrawn from separator 27 is passed by line 28 to compressor 33, the compressor discharging a high pressure hydrogen stream to line 34. A portion of the hydrogen in line 34 can be passed via line 35 to the reforming reactor furnace 18 in admixture with naphtha from line 16. A portion of the hydrogen produced in reformer 20 is passed via line 34 to compressor 36, then via line 37 for use in the hydrofining reactor.

As a preferred embodiment of the present invention, the reforming section of the combined hydrofining-reforming process is operated at a higher pressure than the hydrofining section; i.e., the hydrogen is available at the compressor 33 discharge at a pressure higher than the pressure used in the hydrofiner section. Thus, the need of a compressor 36 is eliminated.

The foregoing disclosure of this invention is not to be considered as limiting since many variations can be made by those skilled in the art without departing from the scope or spirit of the appended claims.

What is claimed is:

1. In a combination hydrofining-reforming process wherein a naphtha feedstock containing at least 20 volume percent naphthenes, less than 1000 p.p.m. organic sulfur and less than 10 p.p.m. organic nitrogen is hydrofined in a hydrofining zone in the presence of a conventional hydrofining catalyst and hydrogen under hydrofining conditions including a temperature within the range from 550° F. to 850° F., at superatmospheric pressure and a liquid hourly space velocity in the range from 0.1 to 10, wherein hydrogen sulfide and ammonia are removed from the effluent from said hydrofining zone and wherein said effluent is reformed in a catalytic reforming zone under conventional reforming conditions, including a temperature from 700° F. to 1050° F., a pressure from 200 p.s.i.g. to 750 p.s.i.g., and a liquid hourly space velocity below 10, in the presence of a reforming catalyst and 0.5 mole to 20 moles of hydrogen per mole of hydrocarbon feed to said reforming zone, the improvement which comprises:

(1) operating said process on a self-contained hydrogen basis with sustained high yields of high octane gasoline products for long on-stream periods without the expense of providing equipment for purifying hydrogen and compressing the hydrogen from the hydrofining zone;

(2) correlating the conditions in said hydrofining zone to provide a cracking conversion therein of less than about 10 volume percent of the feed thereto to lower-boiling products;

(3) operating said hydrofining zone substantially on a once-through hydrogen basis and with at least 95 percent of the hydrogen supplied thereto being produced in said reforming zone;

(4) controlling the amount of hydrogen present in said hydrofining zone to fall within the range from 200 to 1000 s.c.f. of hydrogen per barrel of feed to said hydrofining zone;

(5) operating said hydrofining zone at a low pressure within the range from 100 p.s.i.g. to 700 p.s.i.g., said low pressure in said hydrofining zone being maintained at all times during said on-stream period below the pressure in said reforming zone;

(6) using as the catalyst in said reforming zone a catalyst containing from 0.01 to 3 weight percent platinum and 0.01 to 5 weight percent rhenium associated with an alumina-containing support;

(7) correlating the conditions in said reforming zone to provide therein a net production of hydrogen of more than 400 s.c.f. of hydrogen per barrel of hydrocarbon feed to said reforming zone;

(8) operating said reforming zone on a recycle hydrogen basis with at least 95 percent of the hydrogen supplied thereto being produced in said reforming zone and with a portion of the hydrogen produced therein being passed to said hydrofining zone; and (9) operating said process for at least one continuous on-stream period of at least 2000 hours with a $C_5^+$ gasoline product yield decline no greater than 2 volume percent during said on-stream period, based on the feed in said reforming zone.

References Cited

UNITED STATES PATENTS

| 2,431,920 | 12/1947 | Cole | 196—50 |
| 3,105,811 | 10/1963 | Engel | 208—60 |
| 3,409,539 | 11/1968 | Paterson | 208—60 |
| 3,415,737 | 12/1968 | Kluksdahl | 208—139 |
| 3,438,888 | 4/1969 | Spurlock | 208—139 |
| 3,449,237 | 6/1969 | Jacobson et al. | 208—138 |

OTHER REFERENCES

Guthrie, V. B.: Petroleum Products Handbook, McGraw-Hill, New York, 1960 (Ch. 11, p. 11 relied on).

DELBERT E. GANTZ, Primary Examiner

G. J. CRASANAKIS, Assistant Examiner

U.S. Cl. X.R.

208—135